United States Patent [19]

Ludwig

[11] 4,200,269
[45] Apr. 29, 1980

[54] SELF ADJUSTING SHOCK ABSORBER

[76] Inventor: George C. Ludwig, 845 Whitehall Cir. South, Florence, S.C. 29503

[21] Appl. No.: 858,617

[22] Filed: Dec. 8, 1977

[51] Int. Cl.² ............................................. B60G 17/00
[52] U.S. Cl. ........................... 267/65 D; 267/DIG. 2; 280/6 H
[58] Field of Search ................... 267/8 R, 64 R, 64 B, 267/65 R, 65 D, DIG. 1, DIG. 2; 280/6 H, 702, 708, 709

[56] References Cited

U.S. PATENT DOCUMENTS

| | | | |
|---|---|---|---|
| 2,436,573 | 2/1948 | Heynes | 267/64 R |
| 3,033,556 | 5/1962 | Wossner | 267/64 R |
| 3,148,871 | 9/1964 | Wilkins et al. | 280/708 |
| 3,150,867 | 9/1964 | Droegkamp | 267/8 R |
| 3,380,247 | 4/1968 | Colmerauer | 280/709 |
| 3,610,656 | 10/1971 | Klees | 280/709 |

FOREIGN PATENT DOCUMENTS 1287454 1/1969 Fed. Rep. of Germany .... 267/DIG. 2

Primary Examiner—Edward R. Kazenske
Attorney, Agent, or Firm—Barnes, Kisselle, Raisch & Choate

[57] ABSTRACT

A self adjusting shock absorber comprising a cylinder and a shock absorbing piston movable in the cylinder and having a shaft extending externally of the cylinder. A reservoir is associated with one end of the cylinder. A flow passage is provided in the shock absorbing piston. A pump comprises a cylinder formed in the shock absorbing piston, and having a position sensing bleed orifice intermediate the ends thereof. A pump piston is fixed to the shock absorbing cylinder and is operable in the pump cylinder. The piston functions when in a position on one side of the position sensing bleed orifice to produce a pump "down" cylinder and when operating on the other side of the position sensing bleed orifice to provide a pump "up" cylinder. The pump piston has a first passage providing selective communication between the shock absorbing cylinder and one end of the pump cylinder, and a second passage providing communication between the shock absorbing cylinder and the other end of the pump cylinder. Check valves are associated with the passages.

3 Claims, 6 Drawing Figures

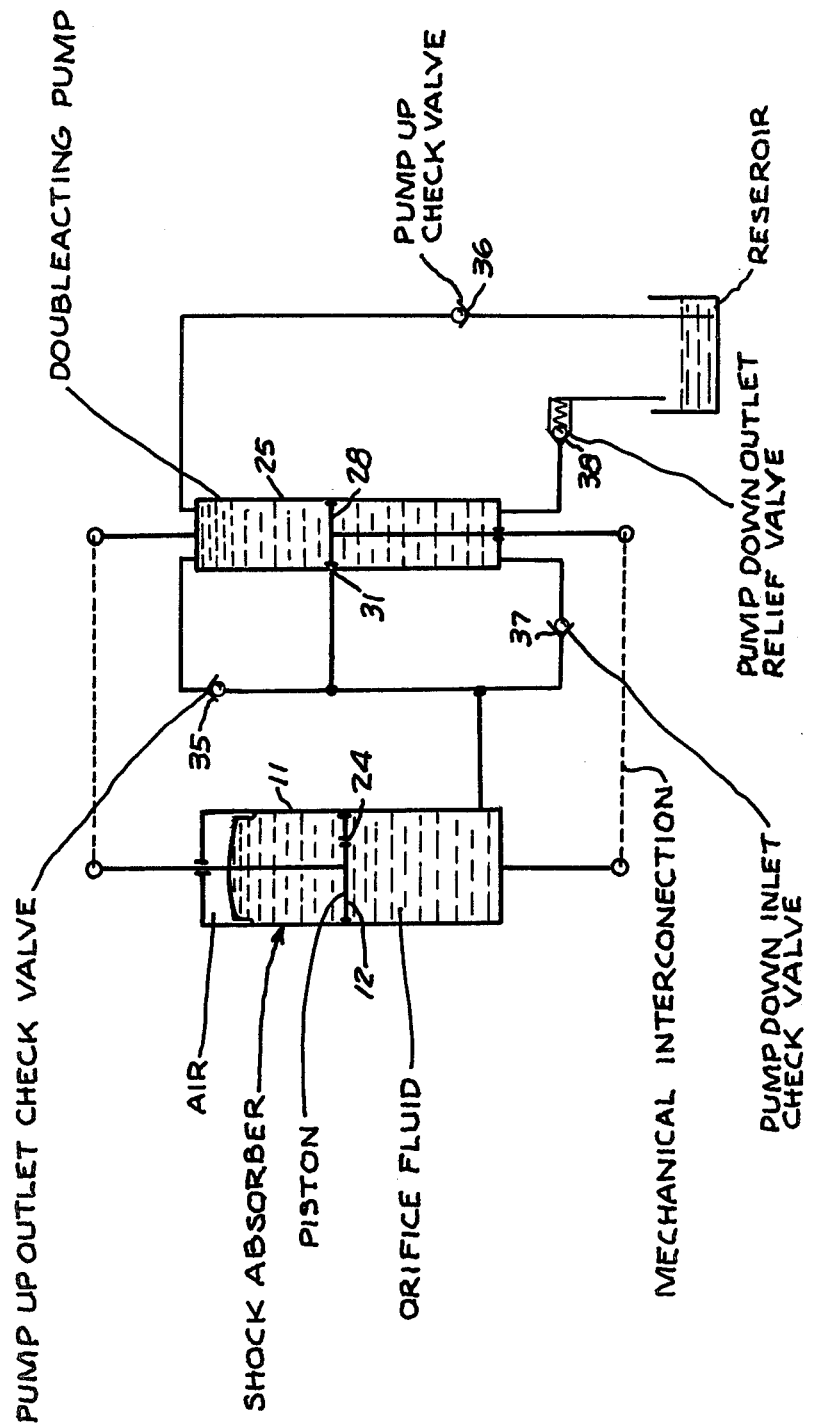

SELF ADJUSTING SHOCK ABSORBER

This invention relates to self leveling shock absorbers.

BACKGROUND AND SUMMARY OF THE INVENTION

Existing shock absorbers dampen automotive vehicle bounce and jounce by converting the energy stored in the compressed suspension springs into heat.

Present level control systems used in automotive vehicles consist of a pair of shock absorbers with integral air springs, a level sensing device mounted between the chassis and the rear axle, and a vacuum driven air compressor and reservoir mounted under the hood. This system has the advantage of immediately leveling the vehicle as soon as the engine is started, however, it is an expensive, complex and failure prone system.

The present invention is intended to provide a variable force as necessary to support a variable vehicle load at the predetermined level attitude. The variable spring force will be created by varying the pressure of the shock absorber fluid volume, the pressure will act upon the piston rod effective area to provide the spring force. The shock absorber fluid volume may include a compressible air volume or be filled with a compressible fluid. The system includes a coaxial piston pump within a piston rod which utilizes the axial motion of the shock absorber to pump fluid into or out of the shock absorber volume to vary the spring load. The system further includes position sensing which is accomplished by a bleed orifice through the hydraulic pump wall. As vehicle position changes the bleed hole is positioned to bleed and deactivate either the pump "up" or pump "down" portion of the hydraulic pump.

If the vehicle is loaded and must be raised to the level position the bleed orifice is positioned in the pump "down" cylinder rendering it ineffective. The pump "up" cylinder has no bleed so with each bounce and jounce fluid is pumped into the shock absorber volume until the vehicle is level. If the vehicle is unloaded and must be lowered to the level position the bleed orifice is positioned in the pump "up" cylinder rendering it ineffective. The pump "down" cylinder has no bleed so with each bounce and jounce fluid is pumped out of the shock absorber volume until the vehicle is level. Equilibrium is achieved when the bleed hole is centrally located and the fluid pumped into the shock absorber equals the fluid pumped out.

DESCRIPTION OF THE DRAWINGS

FIG. 6 is a schematic of the self adjusting shock absorber embodying the invention.

DESCRIPTION

Figure 1:
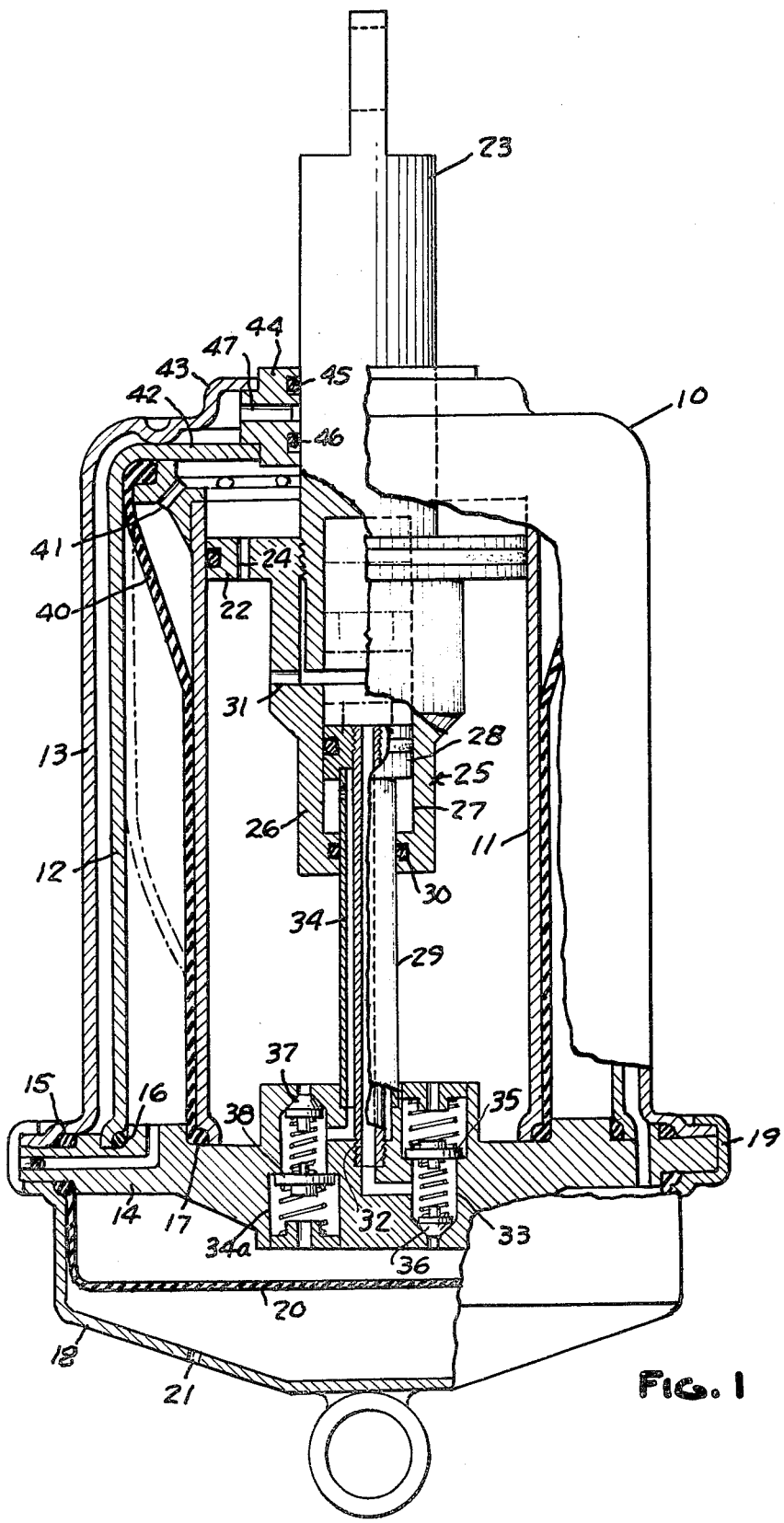
FIG. 1 is a part sectional view of a self adjusting shock absorber embodying the invention.

Referring to FIG. 1, the self contained shock absorber and load leveling system embodying the invention comprises a housing 10 that includes concentric cylindrical walls 11, 12, 13. The lower ends of the walls are closed by a member 14 which has O-rings 15, 16 and an O-ring 17 forming a part of a diaphragm 40 associated therewith. The housing further includes a lower member 18 that is crimped to the member 14 and the outer cylinder 13 by ring 19. The lower member 18 includes a diaphragm 20 that has its periphery clamped against the member 14 and defines a reservoir above the diaphragm with a flexible wall. A vent 21 is provided to atmosphere.

The inner cylinder 11 functions as a shock absorber cylinder with a shock absorber piston 22 operable therein and connected to a shaft 23 that extends to the exterior. The shock absorber piston includes a passge 24 that provides communication between the opposed sides of the piston in the normal fashion of a shock absorber piston.

Further, in accordance with the invention, a pump 25 is associated with the shock absorber and includes a portion 26 of the piston 22 defining a pump cylinder 27. A pump piston 28 is provided in the cylinder 27 and has a portion or shaft 29 that is connected to the member 14. A seal is provided between the shaft 29 and the portion 26 by an O-ring 30. A bleed passage 31 is provided in the portion 26 intermediate the ends of the cylinder 27 and functions as a sensing orifice, as presently described. A first passage 32 extends axially from the upper end of the piston 28 to a chamber 33 and a second passage 34 extends axially from the lower or underside of the piston 28 to a chamber 34a. A chamber 33 is provided with a pump outlet check valve 35 and a pump "up" inlet check valve 36 while the chamber 34a is provided with a pump "down" inlet check valve 37 and a pump "down" outlet relief valve 38.

When the piston 28 is positioned above the bleed orifice 31 it cooperates with the upper end of the cylinder 27 to form a pump "up" cylinder and when the piston 28 is below the bleed orifice 31 it functions with the lower end of the pump cylinder 27 to form a pump "down" cylinder.

A diaphragm 40 is clamped between the upper end of the wall 11 and the wall 12 and functions to maintain the oil pressure in the cylinder 11, the chamber provided by the outer periphery of the diaphragm 40 being provided with compressed air.

The upper end of the cylinder formed by the wall 11 communicates freely with the oil on the inner surface of the diaphragm 40 through openings 41.

The outer walls 12, 13 include end walls 42, 43 which support a shaft seal member 44 that holds O-rings 45, 46 that seal with the shaft 23. Any leakage past the lower O-ring 46 returns through an opening 47 to the reservoir rather than being lost to the exterior so that the outer O-ring 45 is at ambient pressure.

Figure 2:
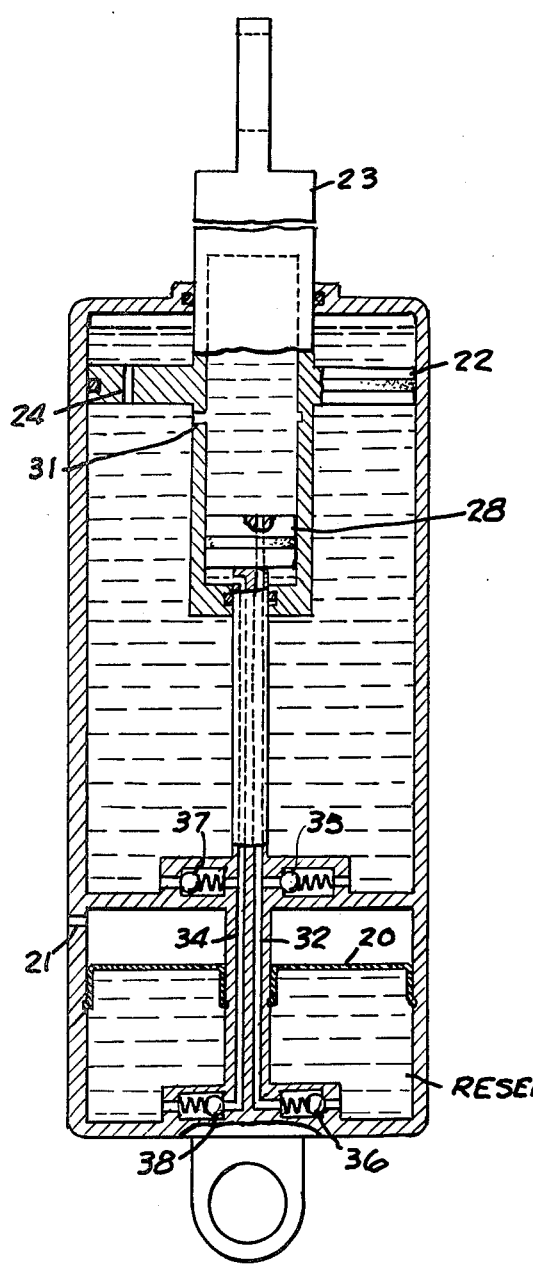
FIGS. 2 and 3 are partly diagrammatic views of the shock absorber shown in different adjusted positions.
Figure 3:
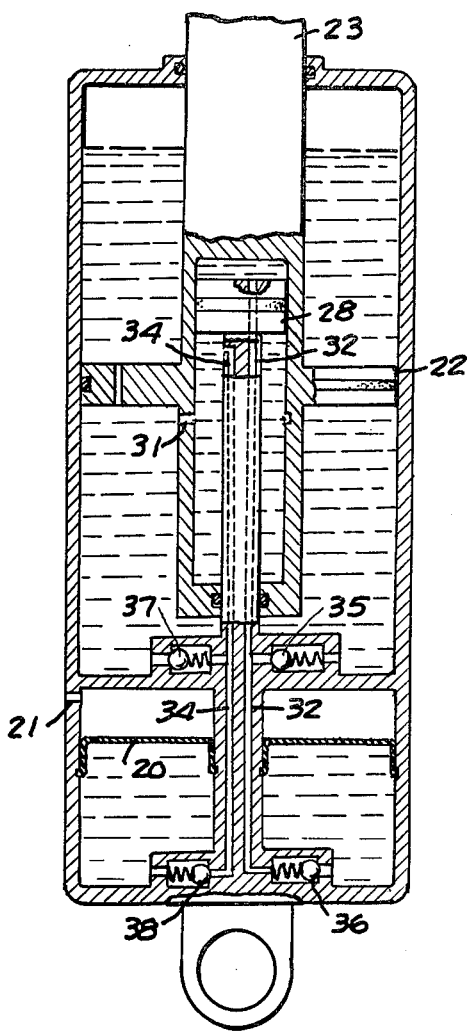
Figure 4:
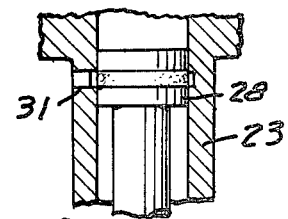
FIG. 4 is a fragmentary sectional view of a portion of the shock absorber shown in FIGS. 2 and 3.

The operation of the system may be understood by reference to schematic diagrams FIGS. 2-4, wherein similar reference numerals are used.

It can thus be seen that self leveling shock absorber basically comprises a standard shock absorber 11 in mechanical parallel with a double acting piston pump 25. This is shown diagrammatically in FIG. 6. The double acting piston pump 25 includes a position sensing bleed orifice 31 which divides the double acting piston pump 25 into an upper "pump up" cylinder above piston 28 and a lower "pump down" cylinder.

Vehicle loading determines the relative position of the position sensing orifice 31. The position sensing orifice 31 functions to render inoperative either the "pump up" cylinder of the "pump down" cylinder depending on the body to axle relationship.

When the body and axle are close to one another as when an increased load is applied, the upper "pump up" cylinder is effective, as shown diagrammatically in FIG. 3, wherein similar reference numerals are used for clarity, to pump reservoir fluid into the shock absorber volume, compressing the air spring an increasing the pressure on the piston rod end of the piston to provide a lifting force. More specifically, the position sensing orifice 31 is positioned in the "pump down" cylinder rendering it ineffective. The "pump up" cylinder has no bleed so that with each bounce and jounce the fluid is pumped into the shock absorber volume until the vehicle is level.

When the body and axle are displaced such as when the vehicle is unloaded, the lower "pump down" cylinder is effective, as shown diagrammatically in FIG. 2, to pump shock absorber fluid into the reservoir thereby expanding the air spring and decreasing the pressure on the piston rod end of the piston and the corresponding lifting force. More specifically, the position sensing orifice is positioned in the upper "pump up" cylinder rendering it ineffective. The "pump down" cylinder has no bleed and so that with each bounce and jounce fluid is pumped out of the shock absorber volume until the vehicle is level.

In either event, equilibrium is reached when the position sensing orifice 31 is centrally located (FIG. 4).

Figure 5:
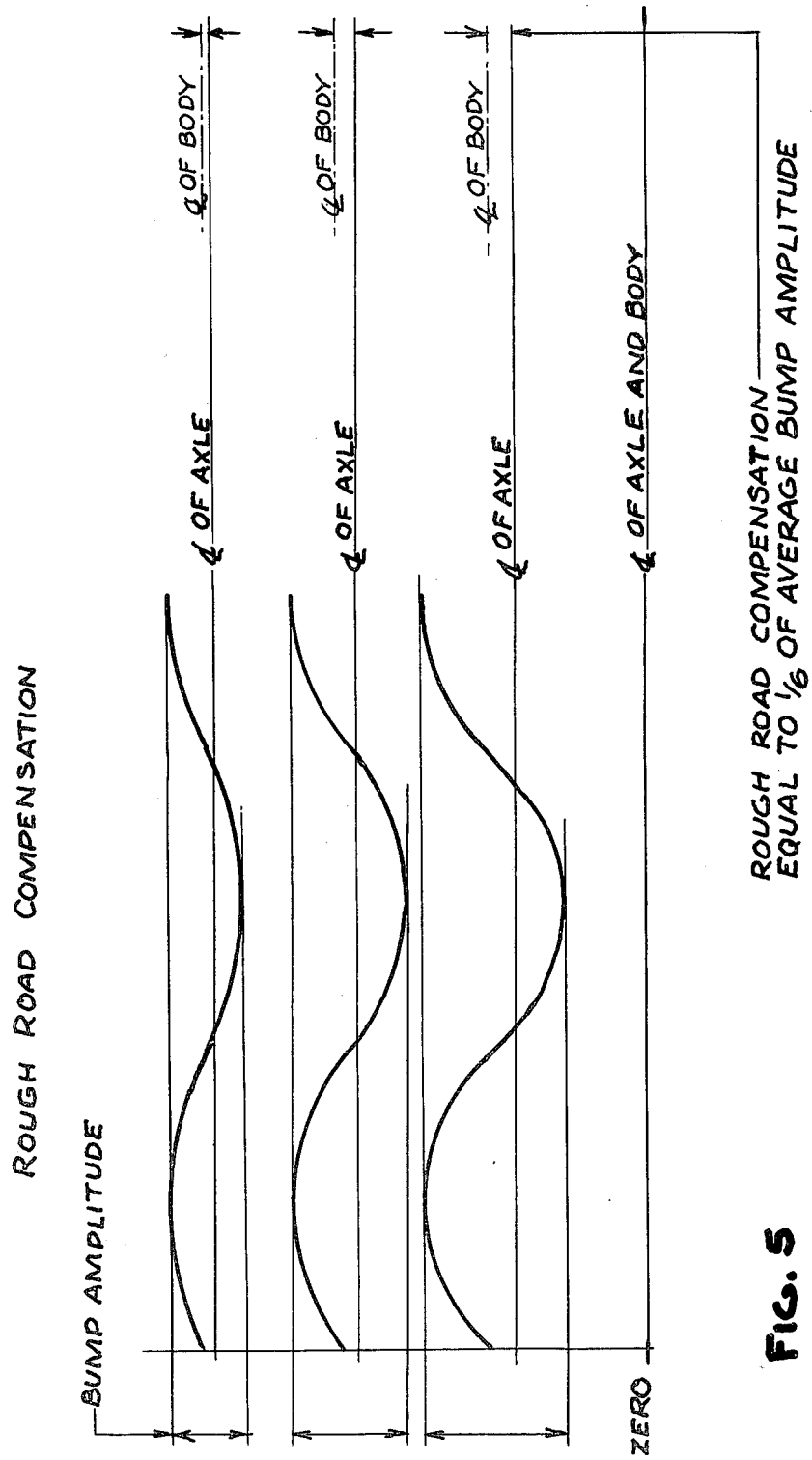
FIG. 5 is a series of curves showing the manner in which the shock absorber functions.

The self-adjusting shock absorber embodying the invention also functions to compensate for road roughness by raising the level position as a function or oscillation of "bump" amplitude. As shown in the curves in FIG. 5, the shock absorber will continually vary the amount of compensation, increasing the level as the amplitude of oscillation increases and decreasing the amplitude as the amplitude of oscillation decreases.

This compensation is achieved due to the differential in piston areas of the piston above and below the piston. Assuming, for example, that the "pump up" piston area, above the piston, has twice the area of the "pump down" piston, below the piston, the "pump down" stroke must be twice the "pump up" stroke to maintain equal "pump up" and "pump down" flow.

Over pressurization in any mode is prevented by the "pump down" relief valve 38 which in series with a line connecting the shock absorbing chamber and the reservoir.

I claim:

1. A self adjusting shock absorber comprising
a shock absorber cylinder,
a shock absorber piston movable in said cylinder and having a shaft extending externally of said cylinder,
a reservoir associated at least in part with one end of said cylinder,
an interflow passage through said shock absorber piston,
a pump comprising a pump cylinder defined by a portion of said shock absorber piston,
said pump cylinder having a wall and a position sensing bleed orifice extending radially through said wall intermediate the ends thereof providing communication between one end of said shock absorber cylinder and said pump cylinder,
a pump piston fixed relative to said shock absorber cylinder and operable in said pump cylinder,
said pump piston functioning when in a position on one side of said position sensing bleed orifice to produce a pump "down" cylinder and when operating on the other side of said position sensing bleed orifice to provide a pump "up" cylinder with the end of said pump cylinder,
a piston rod connected to said pump piston and extending through one end of said pump cylinder,
said shock absorber cylinder including an end wall to which said piston rod is connected so that the piston rod is stationary relative to said shock absorber cylinder,
said pump piston, piston rod, and end wall having a first passage extending therethrough and providing communication between one end of said pump cylinder on said one side of said position sensing bleed orifice and a first chamber in said end wall communicating with said shock absorber cylinder and said reservoir,
said piston rod and end wall having a second passage extending therethrough and providing communication between the other end of said pump cylinder on said other side of said position bleed orifice and a second chamber in said end wall communicating with said shock absorber cylinder and said reservoir,
a pump up inlet check valve in said first chamber operable to permit flow from said reservoir,
a pump up outlet check valve in said first chamber operable to permit flow to said shock absorber cylinder,
a pump down inlet check valve in said second chamber operable to permit flow from said shock absorber cylinder, and
a pump down outlet relief valve in said second chamber operable only at a predetermined pressure above the normal operating pressure in said shock absorber cylinder to permit flow to said reservoir.

2. The self adjusting shock absorber set forth in claim 1 wherein said reservoir is mounted on said shock absorber cylinder.

3. The self adjusting shock absorber set forth in claim 2 wherein said reservoir is formed in part by a flexible wall surrounding said shock absorber cylinder.

* * * * *